(12) United States Patent
Crystal

(10) Patent No.: US 10,982,540 B2
(45) Date of Patent: Apr. 20, 2021

(54) MINING PIN RETENTION SYSTEM

(71) Applicant: ITR America, LLC, Hobart, IN (US)

(72) Inventor: Clayton A. Crystal, Brandon, MS (US)

(73) Assignee: ITR America, LLC, Hobart, IN (US)

( * ) Notice: Subject to any disclaimer, the term of this patent is extended or adjusted under 35 U.S.C. 154(b) by 491 days.

(21) Appl. No.: 15/178,221

(22) Filed: Jun. 9, 2016

(65) Prior Publication Data

US 2016/0362978 A1 Dec. 15, 2016

Related U.S. Application Data

(60) Provisional application No. 62/172,835, filed on Jun. 9, 2015, provisional application No. 62/277,550, filed on Jan. 12, 2016.

(51) Int. Cl.
*E21C 25/56* (2006.01)
*E21C 25/36* (2006.01)
*F16B 37/14* (2006.01)

(52) U.S. Cl.
CPC .............. *E21C 25/56* (2013.01); *E21C 25/36* (2013.01); *F16B 37/14* (2013.01)

(58) Field of Classification Search
CPC .......... E21C 25/34; E21C 25/36; E21C 25/56; Y10T 403/32893; E02F 9/2825; E02F 9/2833; E02F 9/2841; F16G 13/06; F16G 13/07; F16B 37/14; F16B 39/34; F16B 19/02; F16B 21/125
See application file for complete search history.

(56) References Cited

U.S. PATENT DOCUMENTS

| | | | |
|---|---|---|---|
| 1,011,398 A | 12/1911 | Andregg | |
| 1,838,139 A * | 12/1931 | Fitch | B66C 13/00 254/326 |
| 2,129,420 A | 9/1938 | Guy | |
| 2,162,811 A | 6/1939 | Guy | |
| 2,450,694 A * | 10/1948 | Sauer | F16B 39/34 411/303 |
| 2,846,248 A | 8/1958 | Kliwer | |
| 3,198,563 A * | 8/1965 | Steidl | F16C 11/045 384/416 |
| 3,240,100 A * | 3/1966 | Rose | F16B 19/02 411/452 |
| 3,638,980 A * | 2/1972 | Kleinhenn | F16B 39/08 411/320 |
| 3,679,265 A | 7/1972 | Krekeler | |
| 3,787,091 A | 1/1974 | Paolini et al. | |

(Continued)

FOREIGN PATENT DOCUMENTS

| AU | 631968/90 B | 7/1992 |
|---|---|---|
| CN | 202176672 | 9/1948 |

(Continued)

OTHER PUBLICATIONS

'Nuts (hardware)' (Wikipedia) May 26, 2015. Retrieved from the Internet on Aug. 9, 2016. URL:<https://web.archive.org/web/20150526221608/https://en.wikipedia.org/wiki/Nut_(hardware)>.

*Primary Examiner* — Matthew R McMahon
(74) *Attorney, Agent, or Firm* — Butler Snow LLP

(57) ABSTRACT

An improved drive pin retention system for mining chains is disclosed, including several embodiments. The drive pin retention system further decreases the chance that the chain can break due to sheared dowel pins.

3 Claims, 18 Drawing Sheets

(56) References Cited

U.S. PATENT DOCUMENTS

| | | | | |
|---|---|---|---|---|
| 3,788,711 A * | 1/1974 | Krekeler | | E21C 25/34 305/191 |
| 3,888,133 A | 6/1975 | Krekeler | | |
| 4,019,550 A * | 4/1977 | DeHaitre | | F16B 39/34 411/303 |
| 4,600,343 A * | 7/1986 | Frerejacques | | B23P 19/10 411/303 |
| 4,674,803 A * | 6/1987 | Sterwerf, Jr. | | E21C 25/34 299/82.1 |
| 4,717,206 A * | 1/1988 | Sterwerf, Jr. | | E21C 27/26 299/82.1 |
| 5,242,238 A * | 9/1993 | Warner | | B60G 13/001 248/289.11 |
| 5,329,862 A * | 7/1994 | Breezer | | B65D 19/0012 108/55.5 |
| 5,405,398 A * | 4/1995 | Buford, III | | A61F 2/3886 403/154 |
| 5,607,248 A * | 3/1997 | Hasse | | F16G 15/08 403/165 |
| 5,779,413 A * | 7/1998 | Cosenza | | F16B 39/34 411/302 |
| 5,927,665 A * | 7/1999 | Grabnic | | E02F 3/3604 172/272 |
| 5,927,780 A * | 7/1999 | Chandler | | B66C 1/18 294/74 |
| 6,010,171 A * | 1/2000 | Margiottiello | | B66C 1/54 294/86.25 |
| 6,530,165 B2 * | 3/2003 | Griesemer | | G09F 15/0025 160/378 |
| 6,648,803 B1 * | 11/2003 | Jay | | A63B 25/00 482/75 |
| 6,662,681 B2 * | 12/2003 | Crane | | E02F 3/3613 248/200 |
| 6,698,932 B2 * | 3/2004 | Hamaguchi | | E02F 9/006 384/275 |
| 7,014,139 B2 * | 3/2006 | Schanke | | B65H 16/10 242/422.4 |
| 7,056,073 B2 * | 6/2006 | Ardo | | B60P 7/08 410/100 |
| 7,246,699 B2 * | 7/2007 | Frost | | B65G 17/38 198/850 |
| 7,253,534 B2 * | 8/2007 | Vasilovich | | A63B 21/0053 290/1 C |
| 7,364,381 B2 * | 4/2008 | Seib | | A01B 51/04 403/151 |
| 7,448,823 B2 * | 11/2008 | Silva | | F16B 15/06 403/325 |
| 8,171,715 B2 * | 5/2012 | Segura | | B66C 1/10 59/78 |
| 8,769,799 B2 * | 7/2014 | Emmerich | | F16B 35/04 29/525.02 |
| 8,801,024 B2 * | 8/2014 | Grainger | | B62H 7/00 280/292 |
| 8,807,669 B2 | 8/2014 | McPhail et al. | | |
| 8,991,791 B2 * | 3/2015 | Wright | | B66D 1/36 254/333 |
| 9,086,118 B2 * | 7/2015 | Campbell | | F16G 15/06 |
| 9,283,904 B2 * | 3/2016 | Parenti | | F16B 37/14 |
| 9,868,488 B2 * | 1/2018 | Hackl | | B62K 21/22 |
| 10,364,553 B2 * | 7/2019 | Snyder | | E02F 9/2841 |
| 2006/0231820 A1 | 10/2006 | Bilby | | |
| 2007/0107412 A1 | 5/2007 | Humcke et al. | | |
| 2011/0283819 A1 * | 11/2011 | Paulus | | A63B 69/345 73/865.4 |
| 2013/0266395 A1 * | 10/2013 | Schuster | | F16B 39/34 411/216 |
| 2014/0086702 A1 * | 3/2014 | Imai | | F16B 39/28 411/190 |
| 2016/0032722 A1 | 2/2016 | Crystal | | |
| 2016/0265254 A1 * | 9/2016 | Carnevali | | F16M 11/14 |
| 2017/0328398 A1 * | 11/2017 | Bradshaw | | F16B 37/0892 |
| 2018/0359929 A1 * | 12/2018 | Hansson | | A01G 3/053 |

FOREIGN PATENT DOCUMENTS

| | | |
|---|---|---|
| CN | 2021176672 U | 3/2012 |
| GB | 302094 A | 12/1928 |
| GB | 760941 A | 10/1954 |
| JP | 60125783 A | 7/1985 |

\* cited by examiner

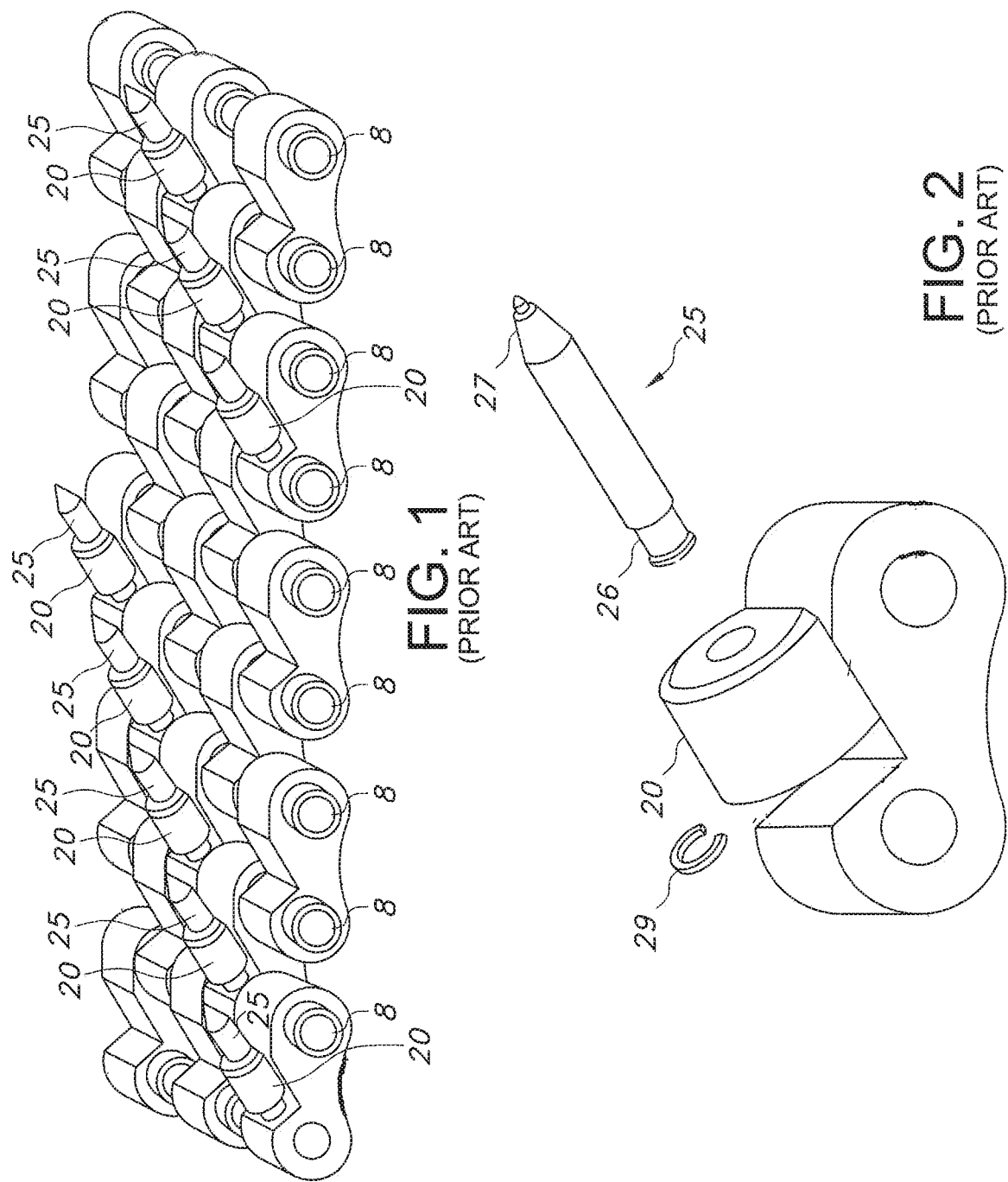

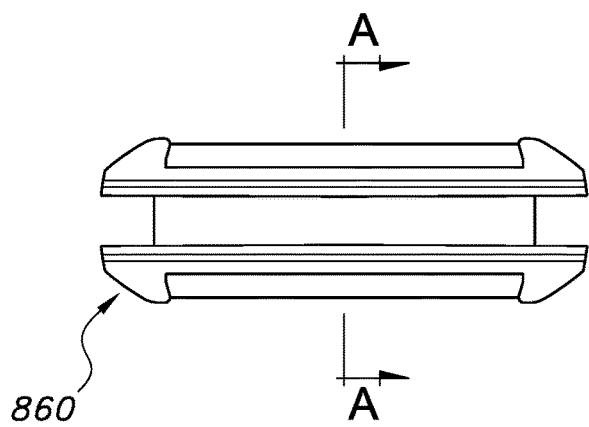 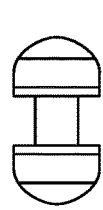 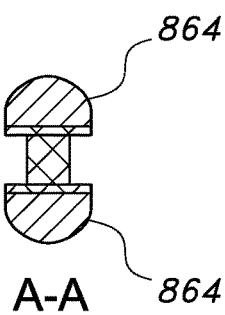
FIG. 7A   FIG. 7B   FIG. 7C
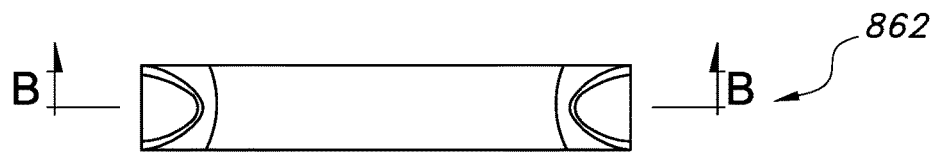
FIG. 7D
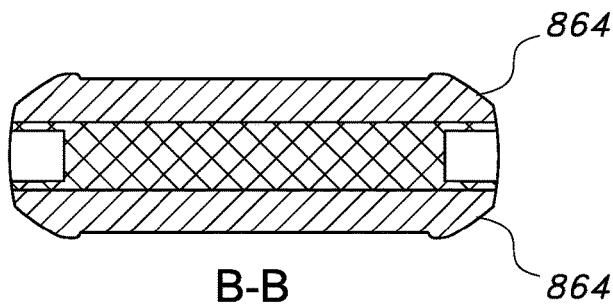
FIG. 7E

US 10,982,540 B2

MINING PIN RETENTION SYSTEM

CROSS-REFERENCE TO RELATED APPLICATION

This application claims the benefit of U.S. Provisional Application No. 62/172,835 filed Jun. 9, 2015, and U.S. Provisional Application 62/277,550 filed Jan. 12, 2016, which are incorporated herein by reference in their entirety.

FIELD OF THE INVENTION

The present invention relates to an apparatus for securing mining chain links.

BACKGROUND OF THE INVENTION

Cutting chains are frequently found in mining operations, including in continuous longwall miners. These chains have tool bits mounted to them that act as picks to repeatedly break apart the surface being mined as the chain is driven around a sprocket.

Although these mining chains are well known in the prior art, previously known mining chains are prone to failure due to breakage rather than normal wear.

One frequent area for failure of the mining chain occurs in the connection between links. The links of a mining chain are connected together by drive pins. FIG. 1, FIG. 2, and FIG. 3 depict commonly found mining chains of the prior art. Newer designs of mining chain links, such as that shown in FIG. 4 of applicant's own design, also employ drive pins. Previously known retention systems for the drive pin use dowel pins that can shear or break from lateral force or contact with the mining material. When this occurs, the chain breaks and the miner fails.

The breakage of the chains results in significant downtime and loss of productivity as the continuous longwall miner can no longer function until the chains are repaired or replaced. We disclose herein a drive pin retention mechanism that does not suffer from the problems of the prior art.

SUMMARY OF THE INVENTION

We disclose herein a new drive pin retention system for use in mining chains and other chains comprising: a drive pin having a pin, with retainer cap and various locking mechanisms for securing the retainer cap to the drive pin.

BRIEF DESCRIPTION OF THE DRAWINGS

Further advantages of the invention will become apparent by reference to the detailed description of preferred embodiments when considered in conjunction with the drawings:

FIG. 1 depicts a portion of a mining chain of the prior art.

FIG. 2 depicts a cutting link of the mining chain of the prior art.

FIG. 6A depicts a drive pin, and FIG. 6B depicts a retainer.

FIG. 7A-7E depicts a rubber sandwich pin to be used with the drive pin of FIG. 6. Individually, FIG. 7A depicts a perspective view of the rubber sandwich pin. FIG. 7B depicts a side elevational view of FIG. 7A. FIG. 7C depicts a cross section along plane A-A of FIG. 7A. FIG. 7D depicts a side elevational view of the rubber sandwich pin. FIG. 7E depicts a cross section along plane B-B of FIG. 7D.

FIG. 9A depicts a D-shaped drive pin and retainer secured with a steel spring pin. FIG. 9B depicts a D-shaped drive pin. FIG. 9C depicts a retainer.

FIG. 9D depicts a perspective view of a steel spring pin. FIG. 9E depicts a side elevational view of the steel spring pin.

FIG. 15A depicts a drive pin retention system. FIG. 15B depicts a retainer ring. FIG. 15C depicts a plastic seal. FIG. 15D depicts a dowel pin.

FIG. 16A depicts a drive pin retention system. FIG. 16B depicts a retaining cap.

FIG. 17A depicts a drive pin retention system. FIG. 17B depicts a bolt secured by a nylon insert lock nut, also known as a nyloc nut.

DETAILED DESCRIPTION

Figure 3:
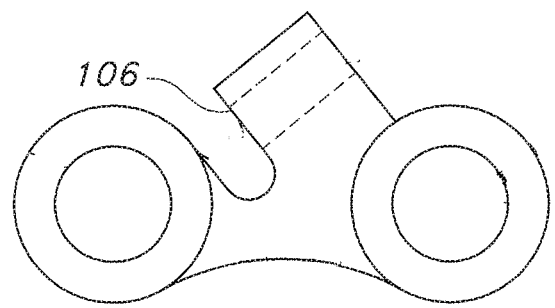
FIG. 3 depicts a cutting link of the mining chain of the prior art.
Figure 4:
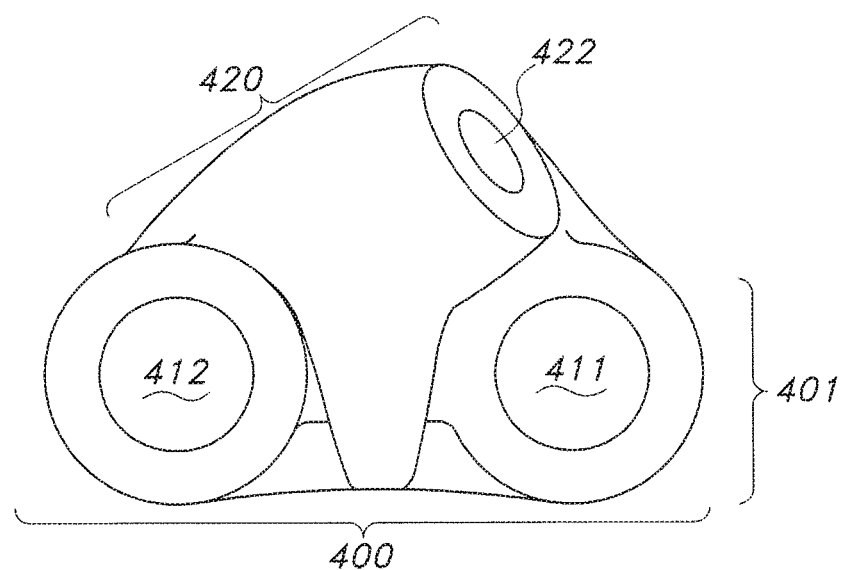
FIG. 4 depicts a cutting link of a mining chain of applicant's own design.
Figure 5:
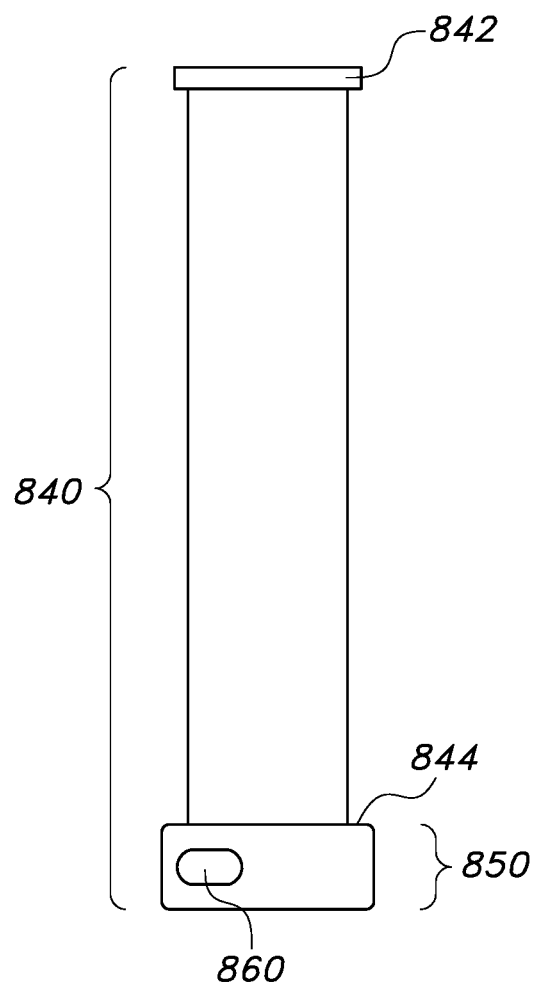
FIG. 5 depicts a perspective view of the presently disclosed drive pin with retention mechanism attached using a rubber sandwich pin.
Figure 6A:
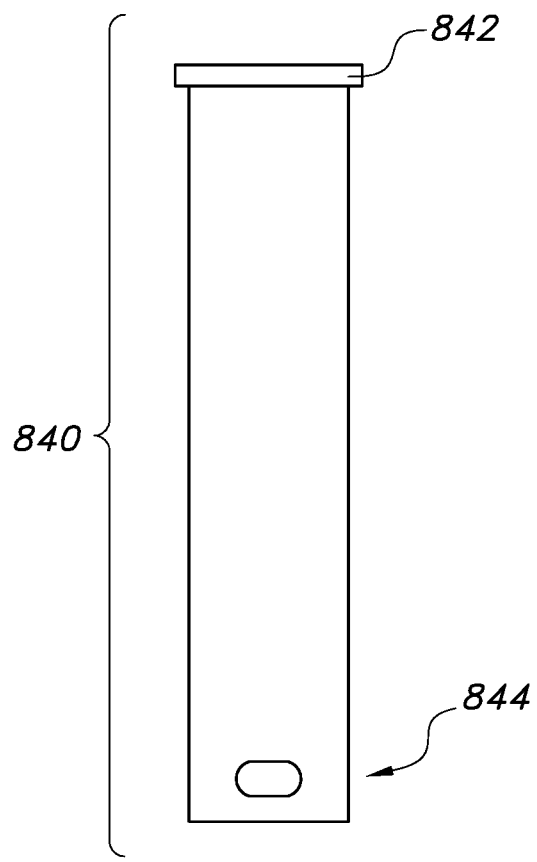
FIGS. 6A and 6B depict a diagram of a drive pin and retainer used with a perpendicular rubber sandwich pin. Individually.
Figure 6B:
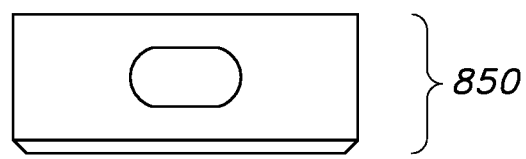
Figure 8:
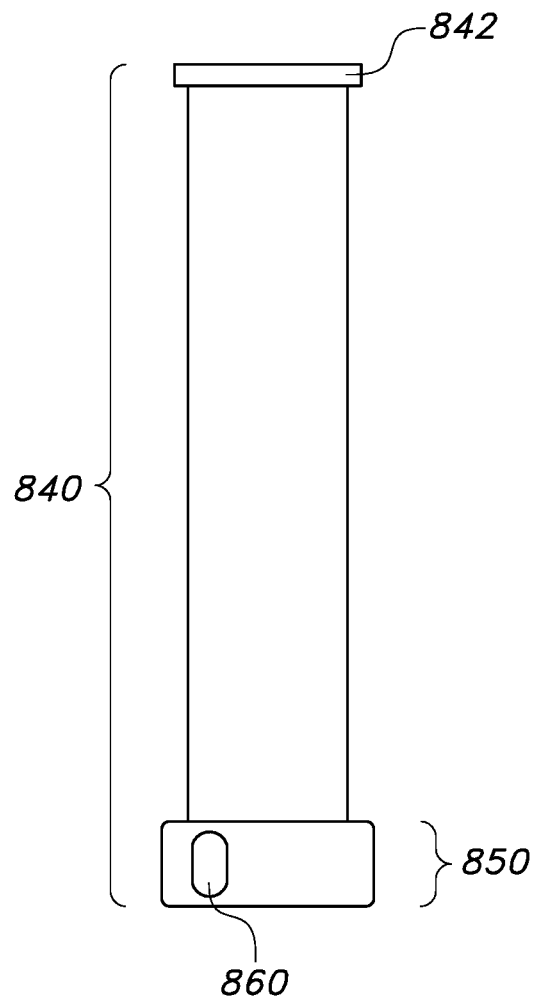
FIG. 8 depicts a drive pin and retainer secured with a rubber sandwich pin oriented in line with the drive pin.
Figure 9A:
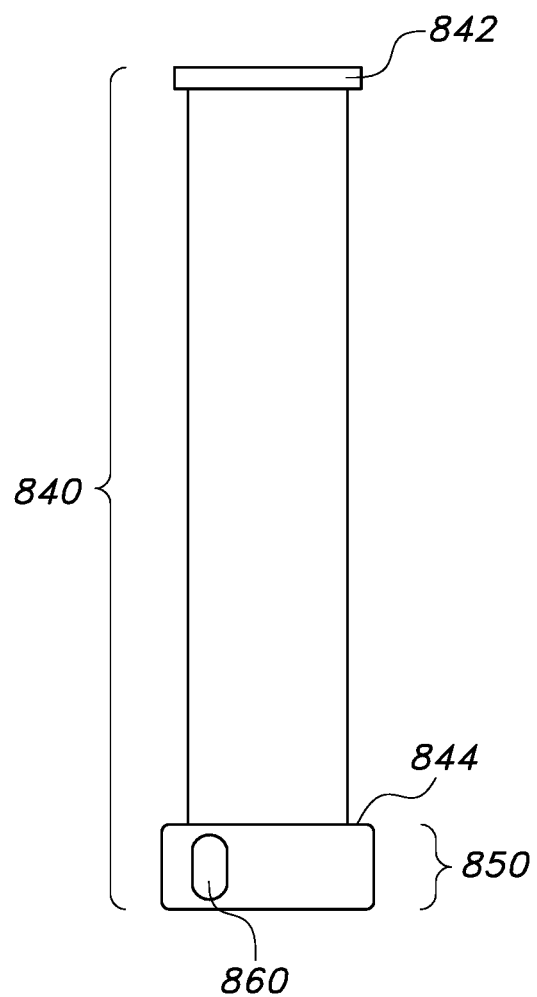
FIG. 9A-9E depicts a D-shaped drive pin and retainer secured with a steel spring pin. Individually.
Figure 9B:
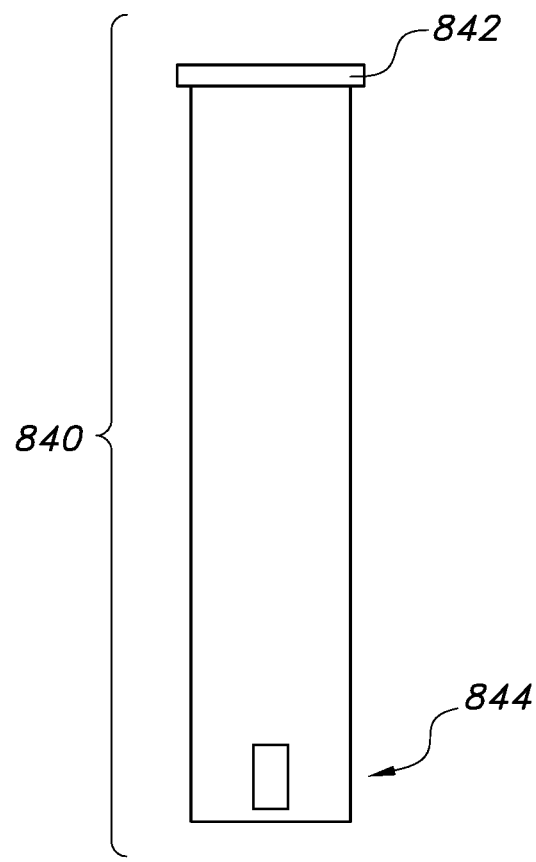
Figure 9C:
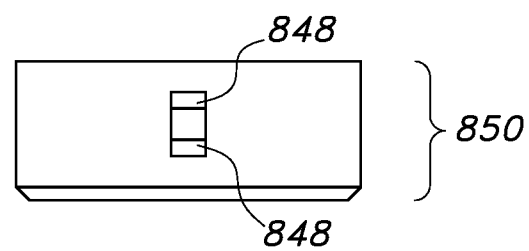
Figure 9D:
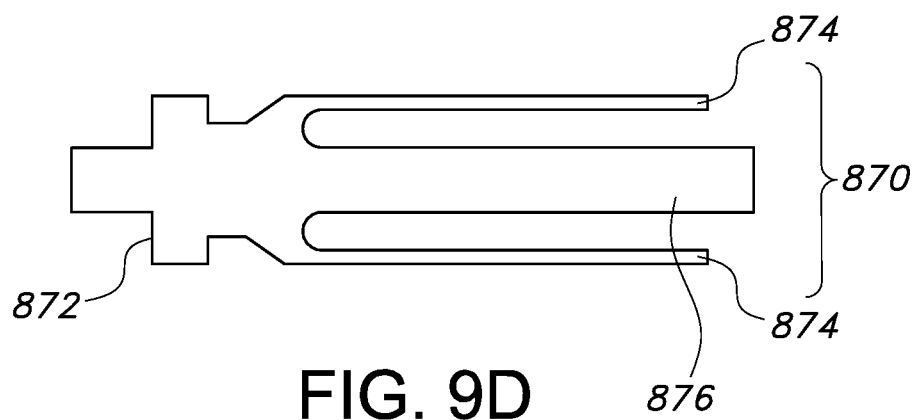
Figure 9E:
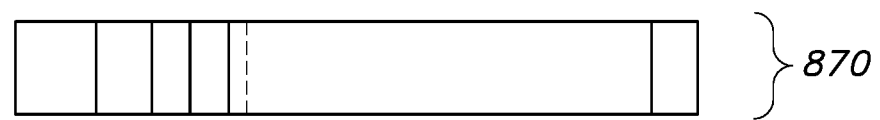

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

A common point of failure in mining chains of the prior art is in the retention mechanism that holds the drive pins 840 (also known as pivot pins) in place. The drive pin 840 is a generally cylindrically-shaped pin that passes through the transverse bores 410 of the mining chain links. It has a pin head 842 on one end and a fastener end 844 at the opposite end.

Often, in the prior art, the drive pin 840 was held in place by a retainer 850 that surrounds the fastener end 844 of the drive pin 840. A dowel pin was driven through a hole in the retainer 850, and through the drive pin hole 848 in the side of the drive pin 840. The dowel pin protruded through the retainer 850, and could easily shear or break from the lateral force or contact with the mining material. When this occurs, the mining chain would break, and the miner fails. Some prior art roller links had protective rings surrounding the retainer that were intended to contain the dowel pin in its location. However, this protective ring could break off, and because there is no positive retention holding the dowel pin in, it could slide out.

In the presently disclosed invention, the drive pin has a retainer 850 held on by dowel pins that are substantially flush with the retainer. In one embodiment, such as depicted in FIGS. 5, 6, 7 and 9, a rubber sandwich pin 860 is used. The rubber sandwich pin 860, as shown in FIG. 7A-E, is constructed of two pieces of elongated metal 864 with a rubber center 862 between them. The rubber center 862 is typically injected into the mold between the elongated metal pieces 864, causing it to adhere to the two elongated metal pieces 864. As can be seen from FIG. 7A and FIG. 7B, the elongated metal pieces 864 are angled inwards toward the ends, with a middle section that is narrower. As the rubber sandwich pin 860 is driven into the drive pin hole 848, it is compressed, and re-expands as it exits the other side of the drive pin 840. This positive retention prevents the rubber sandwich pin 860 from sliding out of the drive pin hole 848.

In another embodiment, as shown in FIG. 9A-9E, a steel spring pin 870 is used. The steel spring 870 depicted in FIGS. 9D and 9E has three prongs and a handle 872. As the steel spring 870 is pushed into the drive pin hole 848 of the drive pin shown in FIG. 9B, the outer prongs 874 extend outward as they pass into the interior of the drive pin hole 848. Because of the spring force of the outer prongs 874 against the retainer 850 shown in FIG. 9C, the steel spring does not easily come out from the drive pin hole 848. Once again, this positive retention keeps the steel spring pin from sliding out of the drive pin hole.

Because this rubber sandwich pin 860 or steel spring pin 870 does not substantially protrude past the retainer 850, there is a significantly reduced chance that either pin will become damaged resulting in the retainer 850 separating from the drive pin 840.

Other potential retainers and dowel pins are shown in FIGS. 11 to 18. In another embodiment, a Hendrix pin or threaded steel pin with a castle nut is used. The castle nut can be held in place using a cotter pin. This is an excellent solution for repairs.

Figure 10:
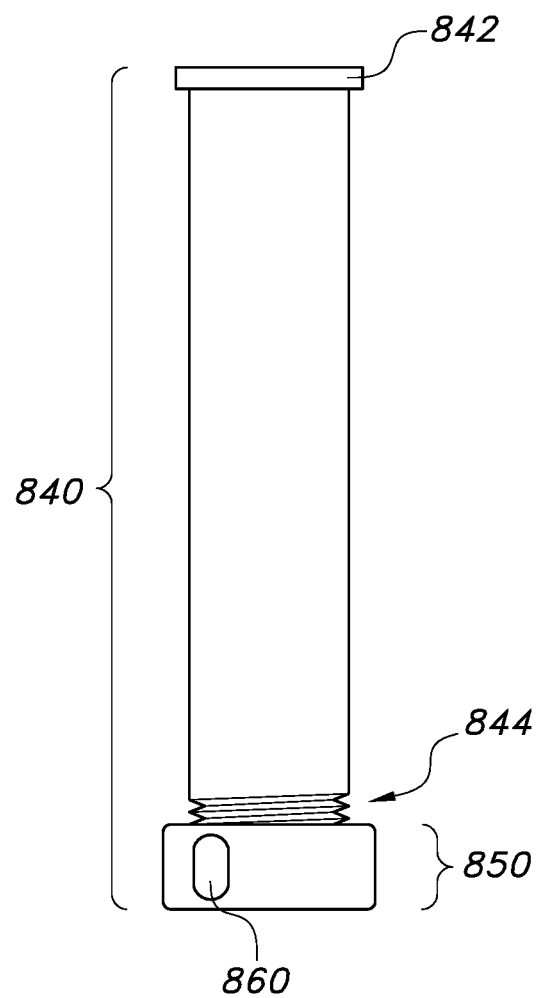
FIG. 10 depicts a threaded drive pin with retainer secured with a rubber sandwich pin oriented in line with the drive pin.
Figure 11:
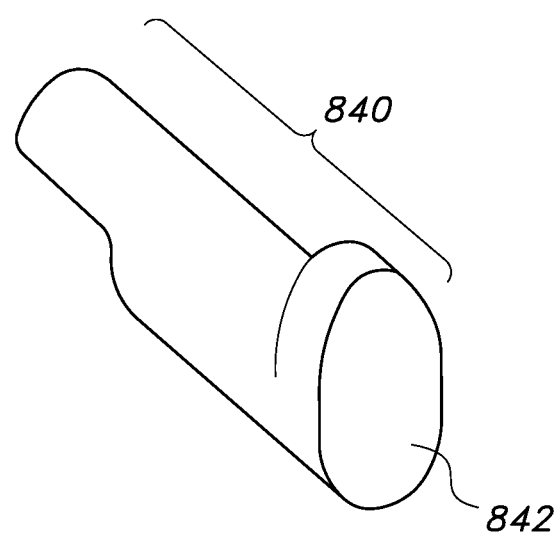
FIG. 11 depicts a perspective view of a pivot pin.
Figure 12:
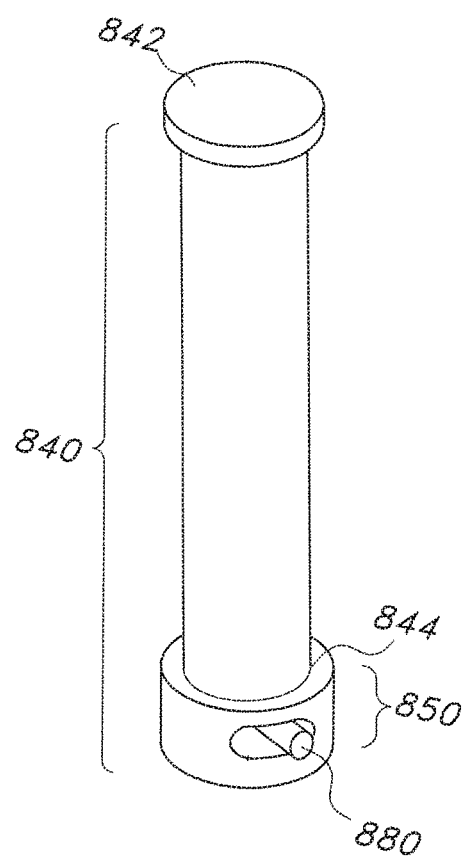
FIG. 12 depicts a perspective view of the presently disclosed chain pin.
Figure 13:
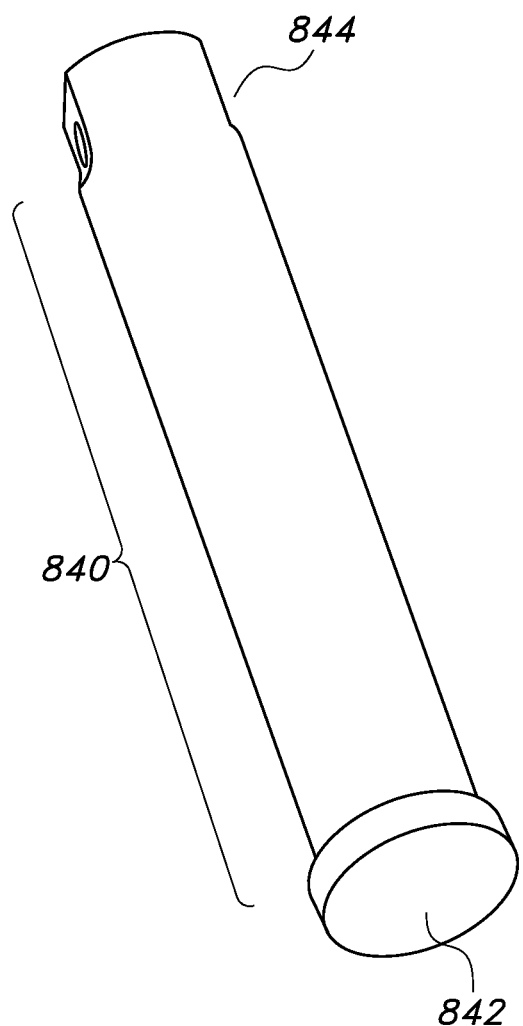
FIG. 13 depicts a perspective view of another embodiment of the presently disclosed mining pin.
Figure 14:
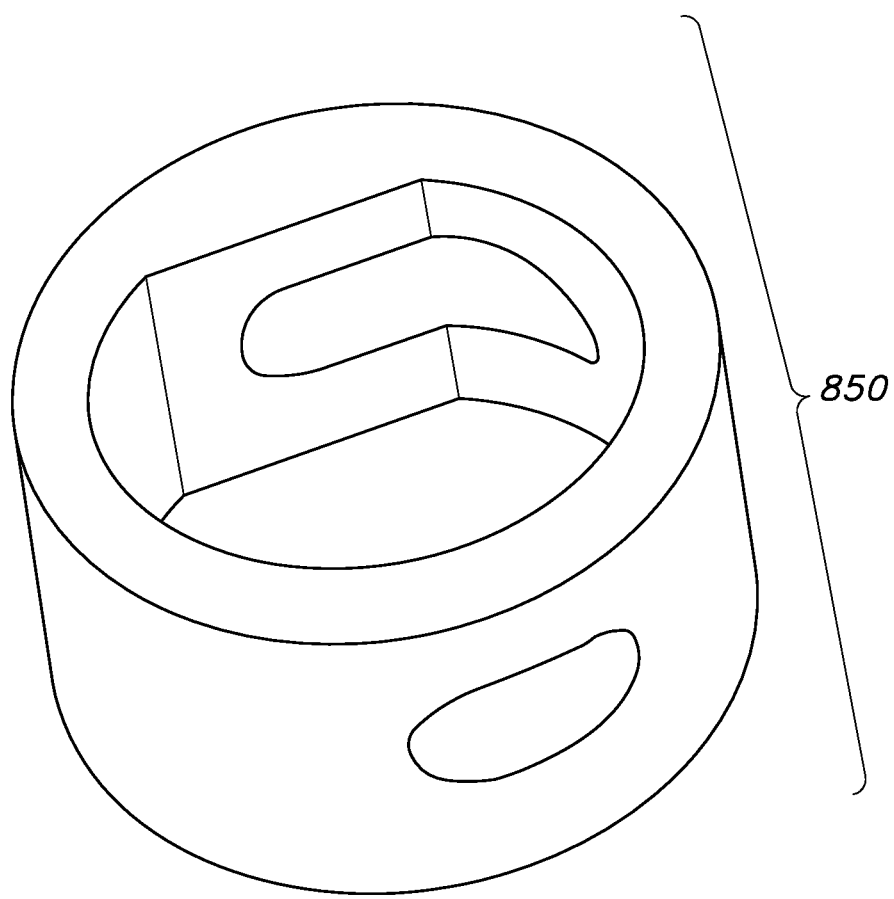
FIG. 14 depicts a perspective view of the presently disclosed mining pin retainer.

The presently disclosed drive pin retention system can be used with any shaped retainer 850 that fits over the fastener end 844 of the drive pin 840. In one embodiment as shown in FIGS. 13 and 14, a D-shaped retainer is used in applications where the drive pin 840 has at least one flat surface cut into the curved sidewall of the drive pin. In another embodiment, such as that shown in FIG. 10, the drive pin 840 can be threaded such that the retainer 850 screws into place. Once the holes in the retainer 850 and the drive pin hole 848 are aligned, a rubber sandwich pin or steel spring pin can be placed into the hole.

Figure 15A:
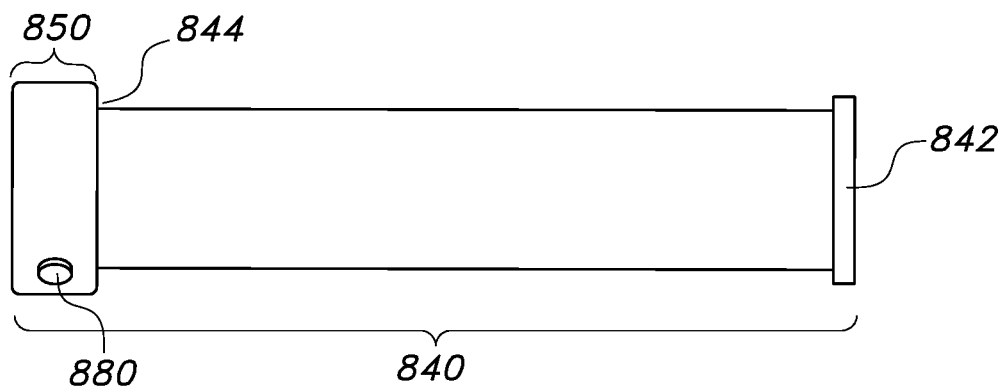
FIG. 15A-D depicts a perspective view of the one embodiment disclosed mining pin with retainer. Individually.
Figure 15B:
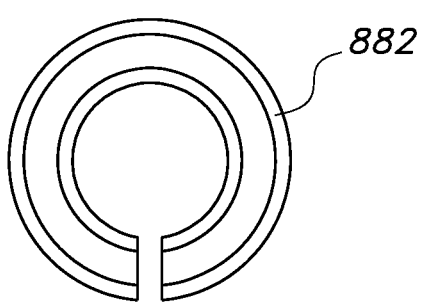
Figure 15C:
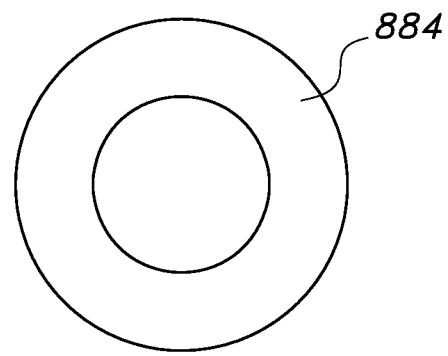
Figure 15D:
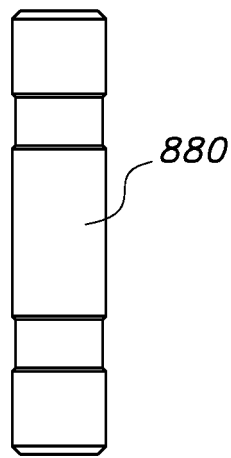

FIG. 15A shows another embodiment of a drive pin retention system. In this embodiment, the retainer 850 is placed over the fastener end 844 of the drive pin 840 (as numbered similarly to FIG. 10). However, in this embodiment, the retainer 850 has two holes that pass all the way through the sidewalls of the retainer along the diameter of the retainer. The drive pin 840 similarly has a drive pin hole 848 that passes through the drive pin 840. FIG. 15D depicts a dowel pin 880 having two notched sections in the surface of the dowel pin such that the diameter at the notched sections is smaller than the diameter of the rest of the dowel pin 880. The dowel pin 880 is intended to pass through the retainer 850 and the drive pin 840. FIG. 15B depicts a retainer ring 882 having an interior diameter slightly larger than the diameter of the notched section, but smaller than the diameter at the unnotched section. The retainer ring 882 is able to open up slightly under pressure to accommodate the wider sections of the dowel pin 880. This is accomplished by having the retainer ring 882 be C-shaped so that it can be forced to open wider. Alternatively, the retainer ring 882 can be made of a flexible material that allows it to open wider. FIG. 15C depicts a plastic seal 884 that is used to hold the retainer ring 882 in place in the holes of the drive pin 840. The plastic seal 884 also helps prevent the steel pieces from weakening as they rub against each other. A plastic seal 884 and retainer ring 882 are used on each side of the drive pin 840 to keep the dowel pin 880 in place.

As will be appreciated from FIG. 15A-D, the notched dowel pin 880 is held in place by two retainer rings 882 located in the holes of the drive pin 840. Each of the two retainer rings 882 acts individually as a lock to keep the dowel pin 880 in place. The double locking mechanism ensures that the dowel pin 880 stays in place, even if one retainer ring 882 fails.

To operate this drive pin retention system, the retainer 850 is placed over the end of the drive pin 840 such that the holes of the retainer 850 line up with the holes of the drive pin 840. The dowel pin 880 is then hammered through the first hole of the retainer 850 and to the first hole of drive pin 840 which has a retainer ring 882 against its opening, held in place by the plastic seal 884. The hammering of the dowel pin 880 causes the retainer ring 882 to open up as the dowel pin 880 is squeezed through. As the hammering continues, the dowel pin 880 will then pass through the second retainer ring 882 causing it to open up. As the leading notch of the dowel pin 880 passes through the second retainer ring 882, the retainer 850 closes around the leading dowel pin notch. The first retainer ring 882 will then also close around the trailing notch. Thus, each retaining ring 882 will be wrapped tightly in a closed position around the notches of the dowel pin 880.

Figures 16A, 16B:
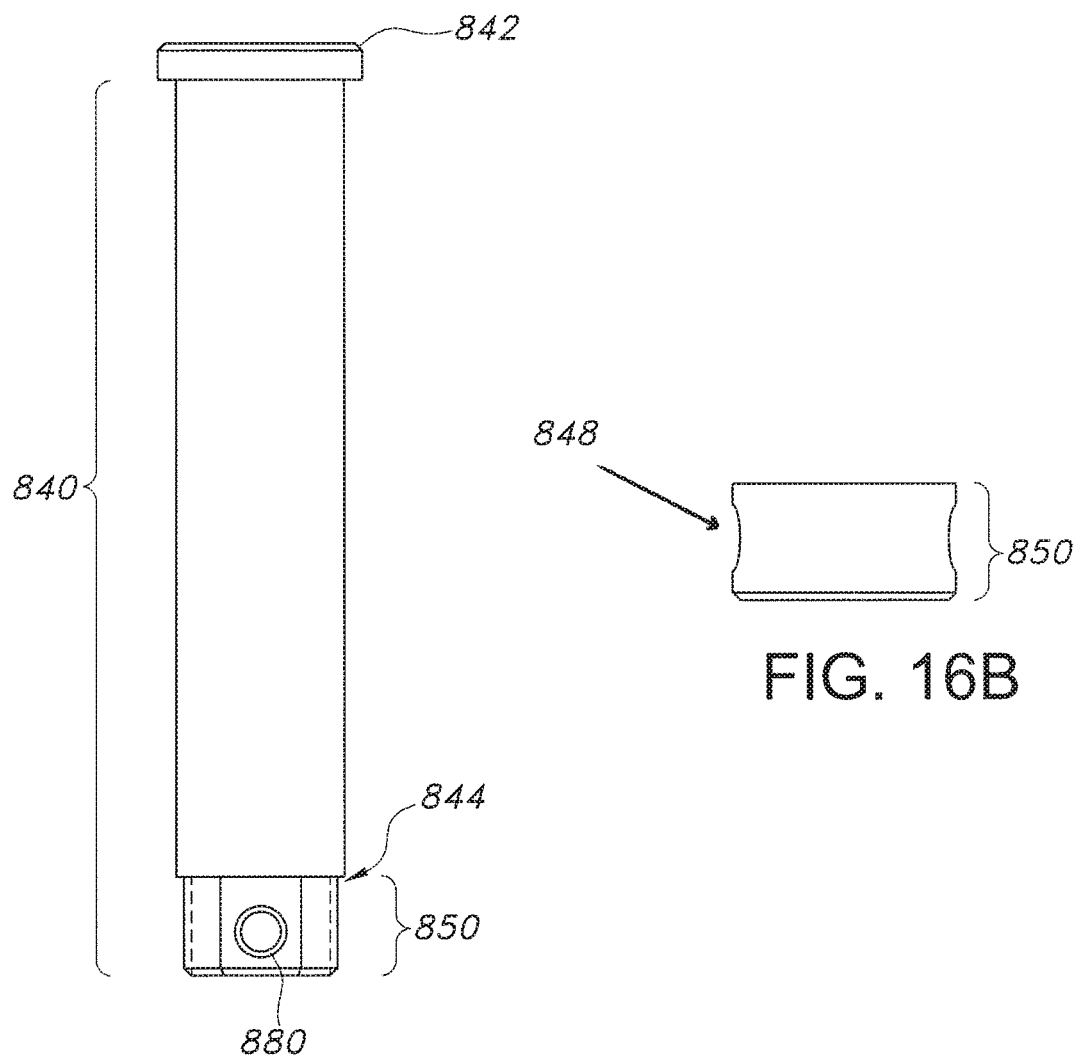
FIG. 16A-B depicts a perspective view of the one embodiment disclosed mining pin with retaining cap and bolt. Individually.
Figure 17A:
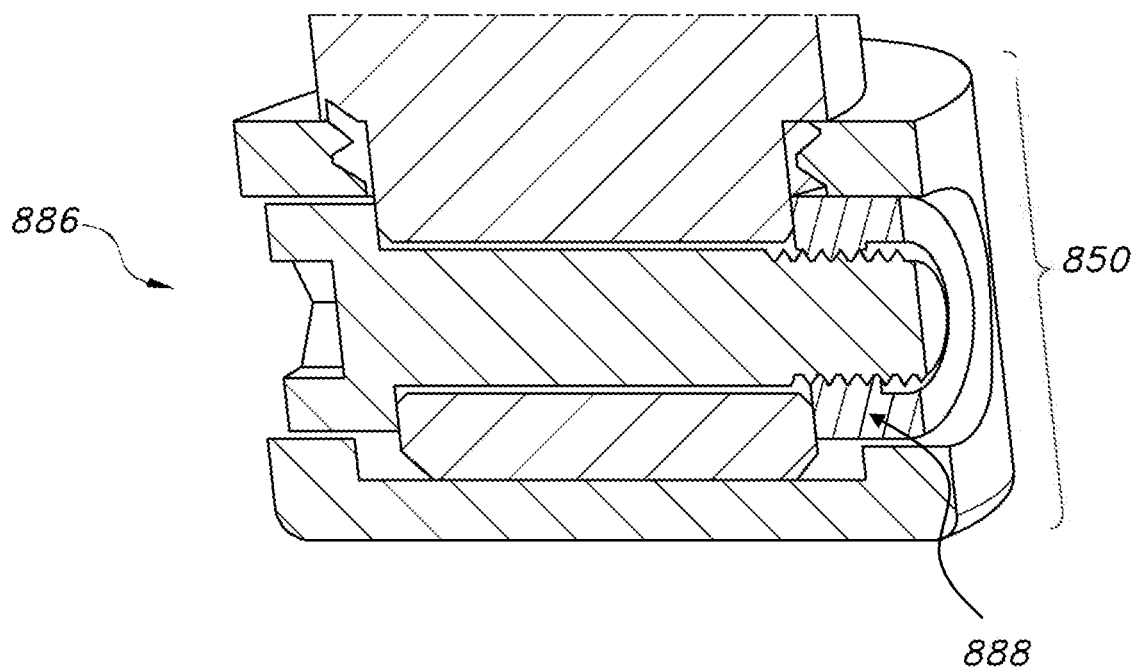
FIG. 17A-B depicts a cross-sectional view of one embodiment of the disclosed mining pin and retaining cap and bolt. Individually.
Figure 17B:
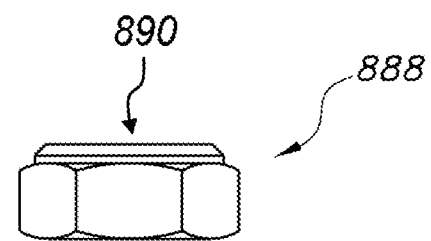

FIG. 16A shows another embodiment of a drive pin retention system. In this embodiment, the retainer 850 is placed over the fastener end 844 of the drive pin 840 (as numbered similarly to FIGS. 10 and 15A). However, in this embodiment, the retainer 850 has two holes that pass all the way through the sidewalls of the retainer 850 along the diameter of the retainer 850 as shown in FIG. 16B. FIG. 17A depicts a bolt 886 which is passed into the interior of the drive pin hole 848 and secured by a nyloc nut 888 as shown in FIG. 17B. The nylon component 890 of the nyloc nut 888 has a smaller inside diameter than the actual nut, thereby acting to lock the nut in place by squeezing the nylon firmly around the bolt when tightened. Unlike a standard locking washer, the nyloc nut 888 prevents the nut from loosening under vibration as the nylon is tightly wedged into the bolt thread and provides resistance to turning once tightened.

Figure 18:
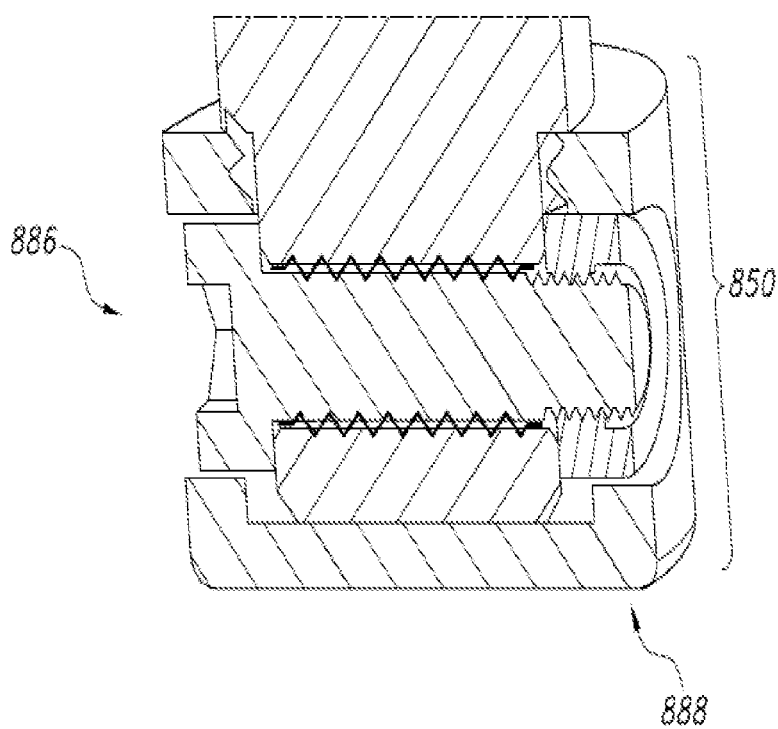
FIG. 18 depicts a cross-sectional view of one embodiment of the disclosed mining pin and retaining cap with fully threaded bolt.

In other potential embodiments of a drive pin retention system, a socket head style bolt can be used. Alternatively a fully threaded bolt as shown in FIG. 18 is passed into the interior of the drive pin hole 848 and secured by a nyloc nut 888 to strengthen the retention system and ensure the drive pin 840 does not loosen due to vibration.

It should be appreciated that the cutting link 400 and the pin retention mechanism does not require a whole new mining chain, but instead can be employed by replacing specific links or the retainer cap. Furthermore, although the invention has been described for use with mining, it can be used in other applications, such as trencher chains. The pin retention system can also be used in any chain application.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A retention system for the drive pin of a chain wherein said retention system comprises:
    a. a drive pin having a pin head disposed at a first end and a fastener end at a second end, wherein said fastener end is configured to receive a single retainer cap and has a drive pin hole in the side of said drive pin for interfacing with a locking mechanism of the retainer cap, wherein the drive pin passes through transverse bores of chain links;
    b. a retainer cap having one end configured to receive the fastener end of the drive pin and said locking mechanism for securing said retainer cap to said drive pin; and
    c. a locking mechanism of the retainer cap comprising a bolt and nyloc nut, the nyloc nut comprising a nylon component and a nut component, wherein the nylon component of the nyloc nut has a smaller inside diameter than the nut component, thereby acting to lock the nyloc nut in place on the bolt by squeezing the nylon component firmly around the bolt when tightened.

2. The device of claim 1 wherein said bolt is threaded.

3. The device of claim 1 wherein said bolt of said locking mechanism of the retainer cap is a socket head style bolt.

* * * * *